(12) United States Patent
Wang

(10) Patent No.: US 10,003,503 B2
(45) Date of Patent: Jun. 19, 2018

(54) TUNNEL TYPE SELECTION METHOD AND APPARATUS

(71) Applicant: Huawei Technologies Co., Ltd., Shenzhen (CN)

(72) Inventor: Jiao Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/298,476

(22) Filed: Oct. 20, 2016

(65) Prior Publication Data
US 2017/0041195 A1 Feb. 9, 2017

Related U.S. Application Data

(63) Continuation of application No. PCT/CN2014/075788, filed on Apr. 21, 2014.

(51) Int. Cl.
*H04L 12/46* (2006.01)
*H04L 12/24* (2006.01)
(Continued)

(52) U.S. Cl.
CPC .......... *H04L 41/12* (2013.01); *H04L 12/4633* (2013.01); *H04L 45/38* (2013.01); *H04L 45/64* (2013.01)

(58) Field of Classification Search
CPC ... H04L 45/00; H04L 12/4633; H04L 47/825; H04W 76/022; H04W 76/025
See application file for complete search history.

(56) References Cited

U.S. PATENT DOCUMENTS 8,472,346 B1 * 6/2013 Bahadur ............ H04L 43/0811
370/254
2012/0155467 A1 6/2012 Appenzeller
(Continued)

FOREIGN PATENT DOCUMENTS

| CN | 103107934 A | 5/2013 |
| CN | 103460666 A | 12/2013 |
| CN | 103607348 A | 2/2014 |

OTHER PUBLICATIONS

"OpenFlow Switch Specification," XP008176971, Open Networking Foundation, Version 1.3.1, Wire Protocol 0x04, ONF TS-007, Sep. 6, 2012, 128 pages.
(Continued)

*Primary Examiner* — Raj Jain
(74) *Attorney, Agent, or Firm* — Conley Rose, P.C.

(57) ABSTRACT

A tunnel type selection method and apparatus, which relate to the field of information technologies, and can reduce data packet forwarding complexity. The method includes first, combining, by a controller, a code and a label value that are corresponding to a tunnel type supported by a next-hop switch, generating an OXM_OF_TUNNEL_ID match field, and sending a forwarding policy that carries the OXM_OF_TUNNEL_ID match field to a previous-hop OPENFLOW switch, then, extracting, by the previous-hop OPENFLOW switch, the code and the label value that are corresponding to the tunnel type, and encapsulating a data packet according to the code and the label value that are corresponding to the tunnel type, finally, sending, by the previous-hop OPENFLOW switch, the encapsulated data packet to the next-hop switch. The embodiments of the present disclosure are applicable to data packet forwarding in a hybrid networking environment of an OPENFLOW switch and a conventional switch.

18 Claims, 5 Drawing Sheets

(51) Int. Cl.
*H04L 12/721* (2013.01)
*H04L 12/715* (2013.01)

(56) References Cited

U.S. PATENT DOCUMENTS

| | | | |
|---|---|---|---|
| 2013/0163427 A1 | 6/2013 | Beliveau et al. | |
| 2013/0343397 A1* | 12/2013 | Lee | H04L 12/4604 370/401 |
| 2014/0016647 A1 | 1/2014 | Yoshida et al. | |
| 2014/0029451 A1* | 1/2014 | Nguyen | H04L 43/50 370/252 |
| 2017/0041195 A1* | 2/2017 | Wang | H04L 41/12 |

OTHER PUBLICATIONS

Lasserre, M., et al., "Framework for DC Network Virtualization," XP15098113, draft-ietf-nvo3-framework-05.txt, Jan. 20, 2014, 24 pages.

Foreign Communication From a Counterpart Application, European Application No. 14890202.6, Extended European Search Report dated Mar. 28, 2017, 10 pages.

"OpenFlow Switch Specification," Open Networking Foundation, Version 1.1.0 Implemented (Wire Protocol 0x02), ONF TS-002, Feb. 28, 2011, 58 pages.

"OpenFlow Switch Specification," Open Networking Foundation, Version 1.3.0 (Wire Protocol 0x04), ONF TS-006, Jun. 25, 2012, 106 pages.

Foreign Communication From a Counterpart Application, PCT Application No. PCT/CN2014/075788, English Translation of International Search Report dated Jan. 30, 2015, 2 pages.

Foreign Communication From a Counterpart Application, PCT Application No. PCT/CN2014/075788, English Translation of Written Opinion dated Jan. 30, 2015, 6 pages.

Foreign Communication From a Counterpart Application, PCT Application No. PCT/CN2014/075788, International Search Report dated Jan. 30, 2015, 3 pages.

Foreign Communication From a Counterpart Application, PCT Application No. PCT/CN2014/075788, Written Opinion dated Jan. 30, 2015, 4 pages.

* cited by examiner

TUNNEL TYPE SELECTION METHOD AND APPARATUS

CROSS-REFERENCE TO RELATED APPLICATIONS

This application is a continuation of International Application No. PCT/CN2014/075788, filed on Apr. 21, 2014, the disclosure of which is hereby incorporated by reference in its entirety.

TECHNICAL FIELD

The present disclosure relates to the field of information technologies, and in particular, to a tunnel type selection method and apparatus.

BACKGROUND

In an SDN (Software Defined Network) environment, interface protocol OPENFLOW specifications define a technology in which a control plane is separated from a forwarding plane. In this mode, an OPENFLOW switch needs to support various tunnel types. The tunnel types include Virtual Local Area Network (VLAN), Virtual extensible Local Area Network (VXLAN), Generic Routing Encapsulation (GRE), and the like.

At present, in a hybrid networking environment of an OPENFLOW switch and a conventional switch, when a tunnel type supported by a first-hop switch is different from a tunnel type supported by a next-hop switch, tunnel switching and a mapping mechanism need to be used to implement forwarding of a data packet from the first-hop switch to the next-hop switch.

However, when a data packet is forwarded using the OPENFLOW switch and the conventional switch, and when neighbor switches support different tunnel types, the tunnel switching and the mapping mechanism need to be introduced. In addition, a gateway or a bridge needs to be introduced into a network, which leads to relatively high data packet forwarding complexity.

SUMMARY

Embodiments of the present disclosure provide a tunnel type selection method and apparatus, which can reduce data packet forwarding complexity.

Technical solutions adopted in the embodiments of the present disclosure are as follows:

According to a first aspect, an embodiment of the present disclosure provides a tunnel type selection method, including determining, by a controller, a tunnel type supported by a next-hop switch, obtaining, by the controller from a tunnel type and code mapping table, code corresponding to the tunnel type, and generating a label value corresponding to the tunnel type, combining, by the controller, the code corresponding to the tunnel type with the label value corresponding to the tunnel type to generate an OXM_OF_TUNNEL_ID match field, and sending, by the controller, a forwarding policy to a previous-hop OPENFLOW switch, where the forwarding policy carries the OXM_OF_TUNNEL_ID match field such that the previous-hop OPENFLOW switch encapsulates a data packet according to the code corresponding to the tunnel type and the label value corresponding to the tunnel type.

With reference to the first aspect, in a first possible implementation manner of the first aspect, before the step of determining, by a controller, a tunnel type supported by a next-hop switch, the method further includes determining, by the controller, whether the previous-hop OPENFLOW switch is an OPENFLOW switch that supports the OXM_OF_TUNNEL_ID match field, where the step of determining, by a controller, a tunnel type supported by a next-hop switch includes, if the previous-hop OPENFLOW switch is an OPENFLOW switch that supports the OXM_OF_TUNNEL_ID match field, determining, by the controller, the tunnel type supported by the next-hop switch.

With reference to the first aspect or the first possible implementation manner of the first aspect, in a second possible implementation manner of the first aspect, before the step of determining, by a controller, a tunnel type supported by a next-hop switch, the method further includes generating, by the controller, code respectively corresponding to all tunnel types, and establishing, by the controller, the tunnel type and code mapping table, where the tunnel type and code mapping table includes all the tunnel types and the code respectively corresponding to all the tunnel types.

With reference to the second possible implementation manner of the first aspect, in a third possible implementation manner of the first aspect, after the step of establishing, by the controller, the tunnel type and code mapping table, the method further includes, when a switch that newly accesses a network exists, determining, by the controller, a tunnel type supported by the switch that newly accesses the network, generating, by the controller, code corresponding to the tunnel type supported by the switch that newly accesses the network, and updating, by the controller, the tunnel type and code mapping table according to the code corresponding to the tunnel type supported by the switch that newly accesses the network.

With reference to the first aspect, the first possible implementation manner of the first aspect, the second possible implementation manner of the first aspect, or the third possible implementation manner of the first aspect, in a fourth possible implementation manner of the first aspect, the tunnel type and code mapping table includes a user-defined tunnel type and code corresponding to the user-defined tunnel type.

According to a second aspect, an embodiment of the present disclosure provides a tunnel type selection apparatus, including a determining unit configured to determine a tunnel type supported by a next-hop switch, an obtaining unit configured to obtain, from a tunnel type and code mapping table, code corresponding to the tunnel type determined by the determining unit, a generation unit configured to generate a label value corresponding to the tunnel type, and combine the code that is corresponding to the tunnel type and that is obtained by the obtaining unit with the label value corresponding to the tunnel type to generate an OXM_OF_TUNNEL_ID match field, and a sending unit configured to send a forwarding policy to a previous-hop OPENFLOW switch, where the forwarding policy carries the OXM_OF_TUNNEL_ID match field generated by the generation unit.

With reference to the second aspect, in a first possible implementation manner of the second aspect, the determining unit is further configured to determine whether the previous-hop OPENFLOW switch is an OPENFLOW switch that supports the OXM_OF_TUNNEL_ID match field, and the determining unit is configured to, when the previous-hop OPENFLOW switch is an OPENFLOW switch that supports the OXM_OF_TUNNEL_ID match field, determine the tunnel type supported by the next-hop switch.

With reference to the second aspect or the first possible implementation manner of the second aspect, in a second possible implementation manner of the second aspect, the generation unit is further configured to generate code respectively corresponding to all tunnel types, and the apparatus further includes an establishment unit, where the establishment unit is further configured to establish the tunnel type and code mapping table, where the tunnel type and code mapping table includes all the tunnel types and the code that is respectively corresponding to all the tunnel types and that is generated by the generation unit.

With reference to the second possible implementation manner of the second aspect, in a third possible implementation manner of the second aspect, the determining unit is further configured to, when a switch that newly accesses a network exists, determine a tunnel type supported by the switch that newly accesses the network, the generation unit is further configured to generate code corresponding to the tunnel type that is determined by the determining unit and that is supported by the switch that newly accesses the network, and the apparatus further includes an update unit, where the update unit is configured to update the tunnel type and code mapping table according to the code that is generated by the generation unit and that is corresponding to the tunnel type supported by the switch that newly accesses the network.

With reference to the second aspect, the first possible implementation manner of the second aspect, the second possible implementation manner of the second aspect, or the third possible implementation manner of the second aspect, in a fourth possible implementation manner of the second aspect, the tunnel type and code mapping table established by the establishment unit includes a user-defined tunnel type and code corresponding to the user-defined tunnel type.

According to a third aspect, an embodiment of the present disclosure provides a controller, including a processor configured to first determine a tunnel type supported by a next-hop switch, then obtain, from a tunnel type and code mapping table, code corresponding to the tunnel type, generate a label value corresponding to the tunnel type, and finally combine the code corresponding to the tunnel type with the label value corresponding to the tunnel type to generate an OXM_OF_TUNNEL_ID match field, and a transmitter configured to send a forwarding policy to a previous-hop OPENFLOW switch, where the forwarding policy carries the OXM_OF_TUNNEL_ID match field generated by the processor.

With reference to the third aspect, in a first possible implementation manner of the third aspect, the processor is further configured to determine whether the previous-hop OPENFLOW switch is an OPENFLOW switch that supports the OXM_OF_TUNNEL_ID match field, and the processor is configured to, when the previous-hop OPENFLOW switch is an OPENFLOW switch that supports the OXM_OF_TUNNEL_ID match field, determine the tunnel type supported by the next-hop switch.

With reference to the third aspect or the first possible implementation manner of the third aspect, in a second possible implementation manner of the third aspect, the processor is further configured to generate code respectively corresponding to all tunnel types, and the processor is further configured to establish the tunnel type and code mapping table, where the tunnel type and code mapping table includes all the tunnel types and the code respectively corresponding to all the tunnel types.

With reference to the second possible implementation manner of the third aspect, in a third possible implementation manner of the third aspect, the processor is further configured to, when a switch that newly accesses a network exists, determine a tunnel type supported by the switch that newly accesses the network, the processor is further configured to generate code corresponding to the tunnel type supported by the switch that newly accesses the network, and the processor is further configured to update the tunnel type and code mapping table according to the code corresponding to the tunnel type supported by the switch that newly accesses the network.

With reference to the third aspect, the first possible implementation manner of the third aspect, the second possible implementation manner of the third aspect, or the third possible implementation manner of the third aspect, in a fourth possible implementation manner of the third aspect, the tunnel type and code mapping table established by the processor includes a user-defined tunnel type and code corresponding to the user-defined tunnel type.

According to a fourth aspect, an embodiment of the present disclosure provides a tunnel type selection method, including receiving, by an OPENFLOW switch, a forwarding policy sent by a controller, where the forwarding policy carries an OXM_OF_TUNNEL_ID match field, extracting, by the OPENFLOW switch from the OXM_OF_TUNNEL_ID match field, code corresponding to a tunnel type supported by a next-hop switch and a label value corresponding to the tunnel type, encapsulating, by the OPENFLOW switch, a data packet according to the code corresponding to the tunnel type and the label value corresponding to the tunnel type, and sending, by the OPENFLOW switch, the encapsulated data packet to the next-hop switch.

According to a fifth aspect, an embodiment of the present disclosure provides a tunnel type selection apparatus, including a receiving unit configured to receive a forwarding policy sent by a controller, where the forwarding policy carries an OXM_OF_TUNNEL_ID match field, an extraction unit configured to extract, from the OXM_OF_TUNNEL_ID match field received by the receiving unit, code corresponding to a tunnel type supported by a next-hop switch and a label value corresponding to the tunnel type, an encapsulation unit configured to encapsulate a data packet according to the code that is corresponding to the tunnel type and that is extracted by the extraction unit, and the label value that is corresponding to the tunnel type and that is extracted by the extraction unit, and a sending unit configured to send a data packet encapsulated by the encapsulation unit to the next-hop switch.

According to a sixth aspect, an embodiment of the present disclosure provides an OPENFLOW switch, including a receiver configured to receive a forwarding policy sent by a controller, where the forwarding policy carries an OXM_OF_TUNNEL_ID match field, a processor configured to extract, from the OXM_OF_TUNNEL_ID match field received by the receiver, code corresponding to a tunnel type supported by a next-hop switch and a label value corresponding to the tunnel type, and encapsulate a data packet according to the code corresponding to the tunnel type and the label value corresponding to the tunnel type, and a transmitter configured to send a data packet encapsulated by the processor to the next-hop switch.

According to the tunnel type selection method and apparatus provided in the embodiments of the present disclosure, first, a controller combines code and a label value that are corresponding to a tunnel type supported by a next-hop switch, generates an OXM_OF_TUNNEL_ID match field, and sends a forwarding policy that carries the OXM_OF_

TUNNEL_ID match field to a previous-hop OPENFLOW switch, then, the previous-hop OPENFLOW switch extracts, from the received OXM_OF_TUNNEL_ID match field, the code and the label value that are corresponding to the tunnel type, and encapsulates a data packet according to the code and the label value that are corresponding to the tunnel type, finally, the previous-hop OPENFLOW switch sends the encapsulated data packet to the next-hop switch. Compared with data packet forwarding using a gateway or a bridge in the prior art, in the embodiments of the present disclosure, a controller generates an OXM_OF_TUNNEL_ID match field according to a tunnel type supported by a next-hop switch, and sends a forwarding policy that carries the OXM_OF_TUNNEL_ID match field to a previous-hop OPENFLOW switch such that the previous-hop OPENFLOW switch encapsulates a data packet according to the tunnel type supported by the next-hop switch, which avoids using tunnel switching, a mapping mechanism, a gateway, or a bridge into a data packet forwarding process, and further reduces data packet forwarding complexity.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

To make the advantages of the technical solutions of the present disclosure clearer, the following describes the present disclosure in detail with reference to the accompanying drawings and embodiments.

Figure 1:
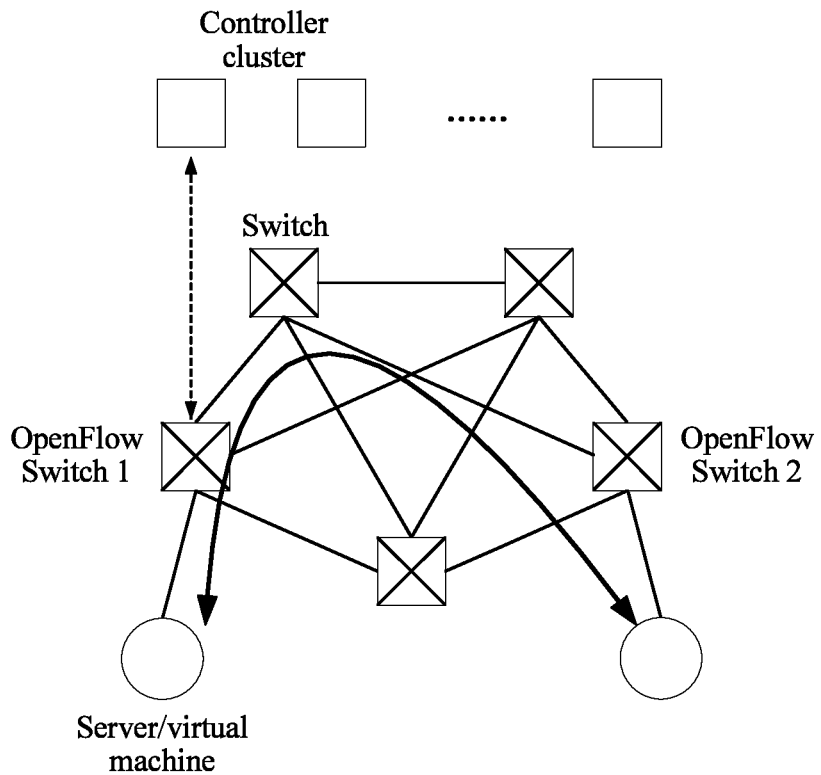
FIG. 1 is a schematic diagram of a system architecture according to an embodiment of the present disclosure.

Technical solutions provided in the embodiments of the present disclosure may be applied to a hybrid networking system architecture of an OPENFLOW switch and a conventional switch, as shown in FIG. 1. A controller cluster in SDN is a controller in the embodiments of the present disclosure. An OPENFLOW switch 1 and an OPENFLOW switch 2 are OPENFLOW switches in the embodiments of the present disclosure, can support an OXM_OF_TUNNEL_ID match field, and allow support for a user-defined tunnel type. The OPENFLOW switch 1 is a previous-hop OPENFLOW switch in the embodiments of the present disclosure. A switch is a next-hop switch in the embodiments of the present disclosure, and can support tunnel types such as VLAN, VXLAN, and GRE. A switch in the embodiments of the present disclosure may be a conventional switch or an OPENFLOW switch. In a hybrid networking network system of an OPENFLOW switch and a conventional switch, a data packet is forwarded according to a solid-line path with an arrow in the figure. In an embodiment, the data packet is first forwarded by a source OPENFLOW switch to a conventional switch, and then is forwarded by the conventional switch to a destination OPENFLOW switch.

Figure 2:
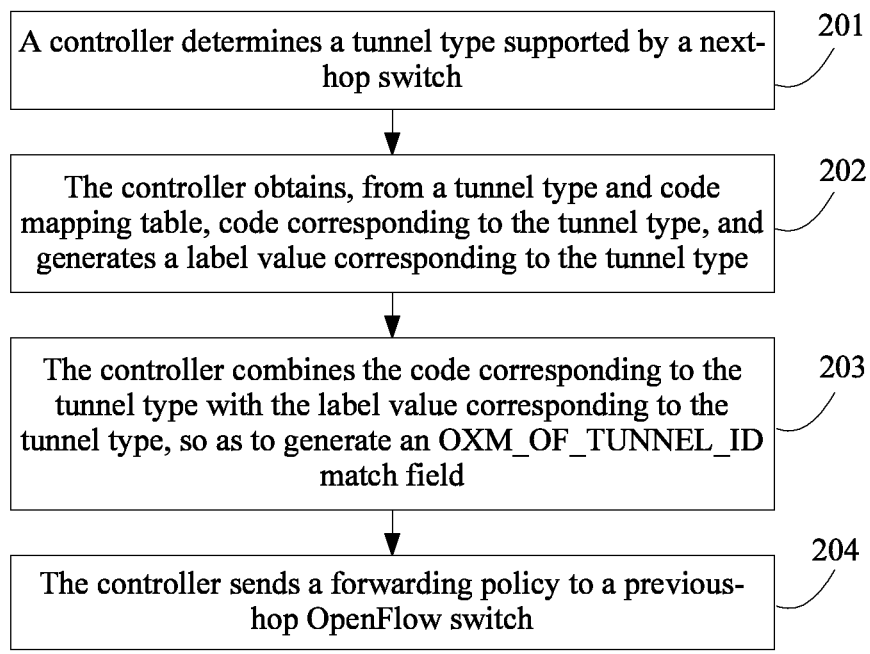
FIG. 2 is a flowchart of a tunnel type selection method according to an embodiment of the present disclosure.

An embodiment of the present disclosure provides a tunnel type selection method. As shown in FIG. 2, the method includes:

201. A controller determines a tunnel type supported by a next-hop switch.

The tunnel type supported by the next-hop switch includes VLAN, VXLAN, GRE, and the like. In this embodiment of the present disclosure, different switches may support different tunnel types.

202. The controller obtains, from a tunnel type and code mapping table, code corresponding to the tunnel type, and generates a label value corresponding to the tunnel type.

For this embodiment of the present disclosure, an OPENFLOW switch is a switch that can support an OXM_OF_TUNNEL_ID match field.

The OXM_OF_TUNNEL_ID match field may be applicable to different tunnel types. For example, the OXM_OF_TUNNEL_ID match field may support a VLAN tunnel type mode, a VXLAN tunnel type mode, a GRE tunnel type mode, a hybrid mode of a VLAN tunnel type and a VXLAN tunnel type, a hybrid mode of a VLAN tunnel type and a GRE tunnel type, a hybrid mode of a VXLAN tunnel type and a GRE tunnel type, and the like. In this embodiment of the present disclosure, the OXM_OF_TUNNEL_ID match field may further be applicable to a user-defined tunnel type.

For this embodiment of the present disclosure, the controller may obtain, from the tunnel type and code mapping table, the code corresponding to the tunnel type. The code corresponding to the tunnel type may be represented using 8 bits (bit), or may be represented using 16 bits, which is not limited in this embodiment of the present disclosure. In this embodiment of the present disclosure, if the code corresponding to the tunnel type is represented using 8 bits, in this case, the tunnel type and code mapping table may be shown in the following table 1

TABLE 1

| Tunnel type | Code corresponding to the tunnel type |
|---|---|
| User-defined tunnel type | 00000000 |
| VLAN tunnel type | 00000001 |
| VXLAN tunnel type | 00000010 |
| GRE tunnel type | 00000011 |
| Hybrid mode of a VLAN tunnel type and a VXLAN tunnel type | 00000100 |
| Hybrid mode of a VLAN tunnel type and a GRE tunnel type | 00000101 |
| Hybrid mode of a VXLAN tunnel type and a GRE tunnel type | 00000110 |

According to the tunnel type and code mapping table, 00000000 represents the user-defined tunnel type, 00000001 represents the VLAN tunnel type, 00000010 represents the VXLAN tunnel type, 00000011 represents the GRE tunnel type, 00000100 represents the hybrid mode of a VLAN tunnel type and a VXLAN tunnel type, 00000101 represents the hybrid mode of a VLAN tunnel type and a GRE tunnel type, 00000110 represents the hybrid mode of a VXLAN tunnel type and a GRE tunnel type.

For example, step 202 may be as follows: Code that is corresponding to the VLAN tunnel type and is obtained by the controller from the tunnel type and code mapping table may be 00000001, and a generated label value corresponding to the tunnel type is 00000000000000000000000000000001111111110001000.

203. The controller combines the code corresponding to the tunnel type with the label value corresponding to the tunnel type to generate an OXM_OF_TUNNEL_ID match field.

For example, step 203 may be as follows. The controller may combine the code 00000001 corresponding to the tunnel type with the label value 00000000000000000000000000000001111111110001000 corresponding to the tunnel type, and a generated OXM_OF_TUNNEL_ID match field may be 0000000100000000000000000000000000000000000001111111110001000.

204. The controller sends a forwarding policy to a previous-hop OPENFLOW switch.

Further, the controller sends the forwarding policy to the previous-hop OPENFLOW switch such that the previous-hop OPENFLOW switch encapsulates a data packet according to the code corresponding to the tunnel type and the label value corresponding to the tunnel type.

The forwarding policy carries the OXM_OF_TUNNEL_ID match field. In this embodiment of the present disclosure, the controller sends the forwarding policy to the previous-hop OPENFLOW switch such that the previous-hop OPENFLOW switch encapsulates a data packet according to the forwarding policy and a tunnel type supported by a next-hop conventional switch.

For this embodiment of the present disclosure, the next-hop switch may be a conventional switch or an OPEN-FLOW switch. The tunnel type supported by the conventional switch may be VLAN, VXLAN, GRE, or the like. The OPENFLOW switch may support the OXM_OF_TUNNEL_ID match field. In this embodiment of the present disclosure, the next-hop switch is a next-hop switch of the previous-hop OPENFLOW switch, the previous-hop OPENFLOW switch is a previous-hop switch of the next-hop switch.

On one hand, when a next-hop switch of the previous-hop OPENFLOW switch is a conventional switch, compared with forwarding data packet by a gateway or a bridge at present, using the method provided in this embodiment of the present disclosure, a data packet may be encapsulated according to code and a label that are of a tunnel type supported by the next-hop conventional switch, which can implement an exchange of the data packet directly between the previous-hop OPENFLOW switch and the next-hop conventional switch, thereby further avoiding using the gateway or the bridge, and reducing data packet forwarding complexity.

On the other hand, when a next-hop switch of the previous-hop OPENFLOW switch is an OPENFLOW switch, using the method provided in this embodiment of the present disclosure, a data packet from the previous-hop OPEN-FLOW switch may be encapsulated according to a tunnel type supported by the next-hop OPENFLOW switch, which can implement an exchange of the data packet directly between the previous-hop OPENFLOW switch and next-hop OPENFLOW switch. In this embodiment of the present disclosure, an OPENFLOW switch can support any tunnel type, that is, can support a tunnel type such as VLAN, VXLAN, or GRE at the same time.

For this embodiment of the present disclosure, as shown in FIG. 1, after the controller sends a forwarding policy to the OPENFLOW switch 1, the OPENFLOW switch 1 may forward the encapsulated data packet to the switch, and the switch may further forward the data packet to the OPEN-FLOW switch 2 according to a tunnel type matched with the switch. In this embodiment of the present disclosure, the OPENFLOW switch 2 parses an encapsulation format of the received data packet, extracts a label value of the tunnel type from the received data packet, generates by a combination an OXM_OF_TUNNEL_ID match field corresponding to the data packet according to the label value of the tunnel type and code that is of the tunnel type and that is preset by the controller, and, matches a corresponding flow table entry in a flow table of the OPENFLOW switch 2.

According to the tunnel type selection method provided in this embodiment of the present disclosure, first, a controller combines code and a label value that are corresponding to a tunnel type supported by a next-hop switch, generates an OXM_OF_TUNNEL_ID match field, and sends a forwarding policy that carries the OXM_OF_TUNNEL_ID match field to a previous-hop OPENFLOW switch, then, the previous-hop OPENFLOW switch extracts, from the received OXM_OF_TUNNEL_ID match field, the code and the label value that are corresponding to the tunnel type, and encapsulates a data packet according to the code and the label value that are corresponding to the tunnel type, finally, the previous-hop OPENFLOW switch sends the encapsulated data packet to the next-hop switch. Compared with data packet forwarding using a gateway or a bridge at present, in this embodiment of the present disclosure, a controller generates an OXM_OF_TUNNEL_ID match field according to a tunnel type supported by a next-hop switch, and sends a forwarding policy that carries the OXM_OF_TUN-NEL_ID match field to a previous-hop OPENFLOW switch such that the previous-hop OPENFLOW switch encapsulates a data packet according to the tunnel type supported by the next-hop switch, which avoids using tunnel switching, a mapping mechanism, a gateway, or a bridge into a data packet forwarding process, and further reduces data packet forwarding complexity.

Figure 3:
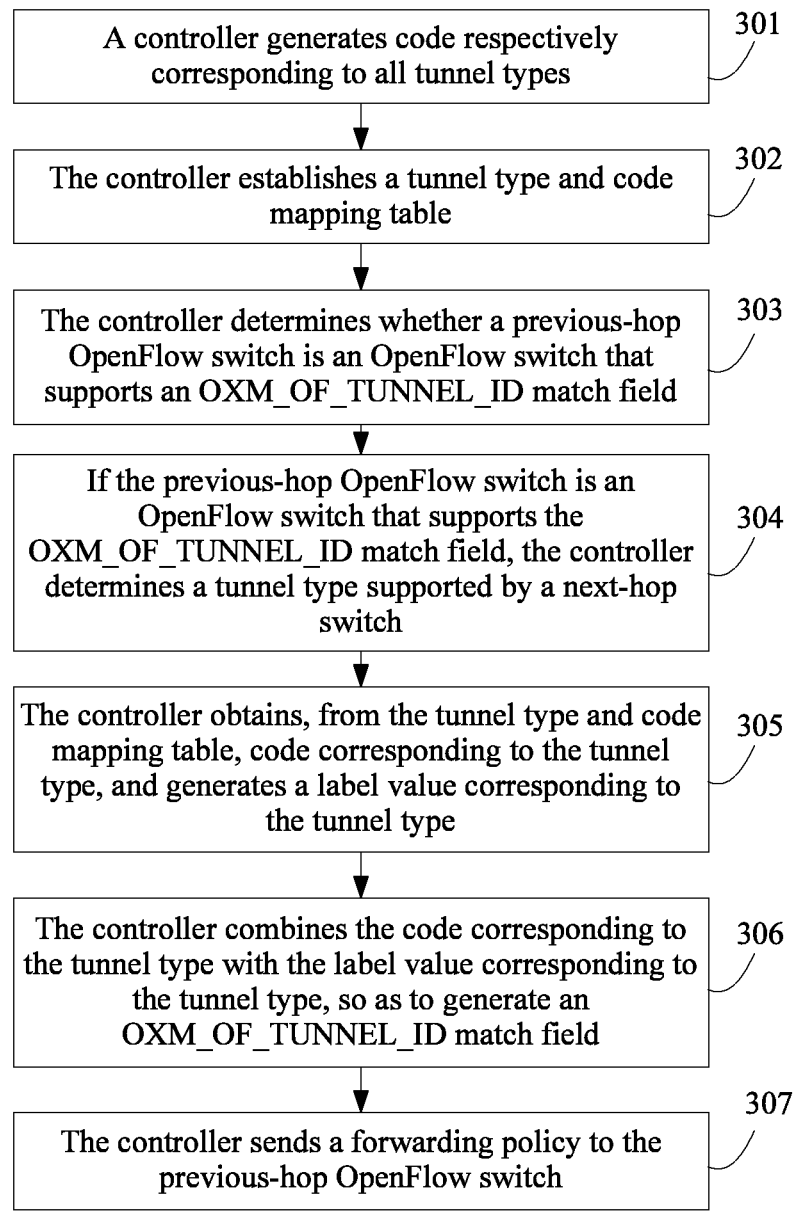
FIG. 3 is a flowchart of another tunnel type selection method according to an embodiment of the present disclosure.

An embodiment of the present disclosure provides another tunnel type selection method. As shown in FIG. 3, the method includes

301. A controller generates code respectively corresponding to all tunnel types.

For example, the controller may generate code 00000000 corresponding to a user-defined tunnel type mode, code 00000001 corresponding to a VLAN tunnel type mode, code 00000010 corresponding to a VXLAN tunnel type mode, code 00000011 corresponding to a GRE tunnel type mode, code 00000100 corresponding to a hybrid mode of a VLAN tunnel type and a VXLAN tunnel type, code 00000101 corresponding to a hybrid mode of a VLAN tunnel type and a GRE tunnel type, and code 00000110 corresponding to a hybrid mode of a VXLAN tunnel type and a GRE tunnel type.

The code corresponding to the tunnel type may be 8 bits, or 16 bits, which is not limited in this embodiment of the present disclosure. In this embodiment of the present disclosure, a 64-bit OXM_OF_TUNNEL_ID match field is split, where some bits of the 64-bit OXM_OF_TUNNEL_ID match field are used to represent the code corresponding to the tunnel type, and the other bits are used to represent a label value corresponding to the tunnel type. For example, if the former 8 bits are used as a tunnel type identifier (tunnel type) and are used to represent the code corresponding to the tunnel type, the latter 56 bits are used as a tunnel type label value (tunnel ID) and are used to represent the label value corresponding to the tunnel type. For another example, if the former 16 bits are used as the tunnel type identifier and are used to represent the code corresponding to the tunnel type, the latter 48 bits are used as the tunnel type label value and are used to represent the label value corresponding to the tunnel type.

302. The controller establishes a tunnel type and code mapping table.

The tunnel type and code mapping table includes all the tunnel types and the code respectively corresponding to all the tunnel types.

For this embodiment of the present disclosure, a tunnel type supported by a conventional switch includes VLAN, VXLAN, GRE, and the like. In this embodiment of the present disclosure, different conventional switches may support different tunnel types.

For this embodiment of the present disclosure, an OPENFLOW switch is a switch that can support an OXM_OF_TUNNEL_ID match field. The OXM_OF_TUNNEL_ID match field may be applicable to different tunnel types. For example, the OXM_OF_TUNNEL_ID match field may support the VLAN tunnel type mode, the VXLAN tunnel type mode, the GRE tunnel type mode, the hybrid mode of a VLAN tunnel type and a VXLAN tunnel type, the hybrid mode of a VLAN tunnel type and a GRE tunnel type, the hybrid mode of a VXLAN tunnel type and a GRE tunnel type, and the like. In this embodiment of the present disclosure, the OXM_OF_TUNNEL_ID match field may further be applicable to a user-defined tunnel type.

For this embodiment of the present disclosure, the tunnel type and code mapping table is established such that tunnel type code corresponding to the tunnel type supported by the conventional switch can be obtained according to the tunnel type supported by the conventional switch, which can implement that an OPENFLOW switch can encapsulate a data packet according to the tunnel type supported by the conventional switch. In this embodiment of the present disclosure, if the code corresponding to the tunnel type is represented using 8 bits, in this case, the tunnel type and code mapping table may be shown in the following table 2

TABLE 2

| Tunnel type | Code corresponding to the tunnel type |
| --- | --- |
| User-defined tunnel type | 00000000 |
| VLAN tunnel type | 00000001 |
| VXLAN tunnel type | 00000010 |
| GRE tunnel type | 00000011 |
| Hybrid mode of a VLAN tunnel type and a VXLAN tunnel type | 00000100 |
| Hybrid mode of a VLAN tunnel type and a GRE tunnel type | 00000101 |
| Hybrid mode of a VXLAN tunnel type and a GRE tunnel type | 00000110 |

According to the tunnel type and code mapping table, 00000000 represents the user-defined tunnel type, 00000001 represents the VLAN tunnel type, 00000010 represents the VXLAN tunnel type, 00000011 represents the GRE tunnel type, 00000100 represents the hybrid mode of a VLAN tunnel type and a VXLAN tunnel type, 00000101 represents the hybrid mode of a VLAN tunnel type and a GRE tunnel type, 00000110 represents the hybrid mode of a VXLAN tunnel type and a GRE tunnel type.

In an embodiment, the tunnel type and code mapping table may include the user-defined tunnel type and code corresponding to the user-defined tunnel type.

For this embodiment of the present disclosure, the tunnel type and code mapping table includes the user-defined tunnel type and the code corresponding to the user-defined tunnel type such that the OXM_OF_TUNNEL_ID match field can support the user-defined tunnel type, and the OPENFLOW switch can encapsulate a data packet according to the user-defined tunnel type supported by the conventional switch.

For this embodiment of the present disclosure, when the tunnel type supported by the conventional switch is the user-defined tunnel type, if a network scale is relatively small, a label value corresponding to the user-defined tunnel type may be represented using a relatively small quantity of bits, and data packet encapsulation, data forwarding and isolation, and the like may be performed according to the label value corresponding to the user-defined tunnel type, for example, the label value corresponding to the user-defined tunnel type is represented using 24 bits. If the network scale is relatively large, capacity expansion may be performed on the label value corresponding to the user-defined tunnel type, for example, when the controller finds that the label value corresponding to the user-defined tunnel type in a current network is insufficient, capacity expansion may be performed on the label value corresponding to the user-defined tunnel type.

0s may be added to the front of or 1s may be added to the front of label values corresponding to all current user-defined tunnel types such that capacity expansion is performed on the label value corresponding to the user-defined tunnel type while ensuring compatibility of a new user-defined tunnel type with an original user-defined tunnel type. For example, if a label value corresponding to an original user-defined tunnel type is 24 bits, after a 0 or a 1 is added to the first 8 bits, the label value corresponding to the user-defined tunnel type may be expanded to 32 bits.

In an embodiment, after step 302, the method may further include, when a switch that newly accesses a network exists, first, determining, by the controller, a tunnel type supported by the switch that newly accesses the network, then, generating code corresponding to the tunnel type supported by the switch that newly accesses the network, and finally, updating the tunnel type and code mapping table according to the code corresponding to the tunnel type supported by the switch that newly accesses the network.

The controller may perform capability negotiation with the switch that newly accesses the network, and therefore determines the tunnel type supported by the switch, and further updates the tunnel type and code mapping table in real time.

For this embodiment of the present disclosure, the tunnel type supported by the switch that newly accesses the network and the code corresponding to the tunnel type are updated to the tunnel type and code mapping table, which can ensure that the tunnel type and code mapping table includes all tunnel types supported by all switches in a network system.

303. The controller determines whether a previous-hop OPENFLOW switch is an OPENFLOW switch that supports an OXM_OF_TUNNEL_ID match field.

For this embodiment of the present disclosure, if the previous-hop switch is an OPENFLOW switch that supports the OXM_OF_TUNNEL_ID match field, and the next-hop switch is also an OPENFLOW switch that supports the OXM_OF_TUNNEL_ID match field, a data packet may be forwarded directly between the previous-hop switch and the next-hop switch according to a value of the OXM_OF_TUNNEL_ID match field.

For this embodiment of the present disclosure, if the previous-hop switch is an OPENFLOW switch that supports the OXM_OF_TUNNEL_ID match field, but the next-hop switch is a conventional switch, a data packet needs to be first encapsulated, according to a tunnel type supported by the conventional switch, on the previous-hop OPENFLOW switch that supports the OXM_OF_TUNNEL_ID match field, and then forwards the encapsulated data packet to the next-hop conventional switch.

In an embodiment, before step 303, the method may further include receiving, by the controller, a new flow forwarding request sent by the previous-hop OPENFLOW switch, and calculating a forwarding path according to the new flow forwarding request.

The controller receives the new flow forwarding request (packet in) sent by the OPENFLOW switch, and therefore the controller can be triggered to generate the OXM_OF_TUNNEL_ID match field according to the tunnel type supported by the conventional switch.

For this embodiment of the present disclosure, the new flow forwarding request may carry a user requirement and a service requirement such that the controller can calculate the forwarding path according to the user requirement and the service requirement, and determine tunnel types respectively supported by all switches on the forwarding path. In this embodiment of the present disclosure, by calculating the forwarding path, the controller can sense a current network topology and further generate a flow table entry dynamically by a decision.

304. If the previous-hop OPENFLOW switch is an OPENFLOW switch that supports the OXM_OF_TUNNEL_ID match field, the controller determines a tunnel type supported by a next-hop switch.

305. The controller obtains, from the tunnel type and code mapping table, code corresponding to the tunnel type, and generates a label value corresponding to the tunnel type.

For example, code that is obtained by the controller according to the VLAN tunnel type and that is corresponding to the tunnel type is 00000001, and a generated label value corresponding to the tunnel type may be 00000000000000000000000000000000000000001 111111110001000.

306. The controller combines the code corresponding to the tunnel type with the label value corresponding to the tunnel type to generate an OXM_OF_TUNNEL_ID match field.

For example, the code that is obtained by the controller according to the VLAN tunnel type and that is corresponding to the tunnel type is 00000001, the generated label value corresponding to the tunnel type may be 00000000000000000000000000000000000001111 111110001000, and a finally-generated OXM_OF_TUNNEL_ID match field is 00000001000000000000000000000000000000000000 00001111111110001000.

307. The controller sends a forwarding policy to the previous-hop OPENFLOW switch.

Further, the controller sends the forwarding policy to the previous-hop OPENFLOW switch such that the previous-hop OPENFLOW switch encapsulates a data packet according to the code corresponding to the tunnel type and the label value corresponding to the tunnel type.

The forwarding policy carries the OXM_OF_TUNNEL_ID match field. In this embodiment of the present disclosure, the controller sends the forwarding policy to the previous-hop OPENFLOW switch such that the previous-hop OPENFLOW switch encapsulates a data packet according to the forwarding policy and a tunnel type supported by a conventional switch.

For this embodiment of the present disclosure, the next-hop switch may be a conventional switch or an OPENFLOW switch. The tunnel type supported by the conventional switch may be VLAN, VXLAN, GRE, or the like. The OPENFLOW switch may support the OXM_OF_TUNNEL_ID match field. In this embodiment of the present disclosure, the next-hop switch is a next-hop switch of the previous-hop OPENFLOW switch, the previous-hop OPENFLOW switch is a previous-hop switch of the next-hop switch.

On one hand, when a next-hop switch of the previous-hop OPENFLOW switch is a conventional switch, compared with data packet forwarding using a gateway or a bridge at present, using the method provided in this embodiment of the present disclosure, a data packet may be encapsulated according to code and a label that are of a tunnel type supported by the next-hop conventional switch, which can implement an exchange of the data packet directly between the previous-hop OPENFLOW switch and the next-hop conventional switch, thereby further avoiding using the gateway or the bridge, and reducing data packet forwarding complexity.

On the other hand, when a next-hop switch of the previous-hop OPENFLOW switch is an OPENFLOW switch, using the method provided in this embodiment of the present disclosure, a data packet from the previous-hop OPENFLOW switch may also be encapsulated according to a tunnel type supported by the next-hop OPENFLOW switch, which can implement an exchange of the data packet directly between the previous-hop OPENFLOW switch and next-hop OPENFLOW switch. In this embodiment of the present disclosure, an OPENFLOW switch can support any tunnel type, that is, an OPENFLOW switch can support a tunnel type such as VLAN, VXLAN, or GRE at the same time.

For this embodiment of the present disclosure, as shown in FIG. 1, after the controller sends a forwarding policy to the OPENFLOW switch 1, the OPENFLOW switch 1 may forward the encapsulated data packet to the switch, and the switch may further forward the data packet to the OPENFLOW switch 2 according to a tunnel type matched with the switch. In this embodiment of the present disclosure, the OPENFLOW switch 2 parses an encapsulation format of the received data packet, extracts a label value of the tunnel type from the received data packet, generates by a combination an OXM_OF_TUNNEL_ID match field corresponding to the data packet according to the label value of the tunnel type and code that is of the tunnel type and that is preset by the controller, and matches a corresponding flow table entry in a flow table of the OPENFLOW switch 2.

According to the tunnel type selection method provided in this embodiment of the present disclosure, first, a controller combines code and a label value that are corresponding to a tunnel type supported by a next-hop switch, generates an OXM_OF_TUNNEL_ID match field, and sends a forwarding policy that carries the OXM_OF_TUNNEL_ID match field to a previous-hop OPENFLOW switch. Then, the previous-hop OPENFLOW switch extracts, from the received OXM_OF_TUNNEL_ID match field, the code and the label value that are corresponding to the tunnel type, and encapsulates a data packet according to the code and the label value that are corresponding to the tunnel type. Finally, the previous-hop OPENFLOW switch sends the encapsulated data packet to the next-hop switch. Compared with data packet forwarding using a gateway or a bridge at present, in this embodiment of the present disclosure, a controller generates an OXM_OF_TUNNEL_ID match field according to a tunnel type supported by a next-hop switch, and sends a forwarding policy that carries the OXM_OF_TUNNEL_ID match field to a previous-hop OPENFLOW switch such that the previous-hop OPENFLOW switch encapsulates a data packet according to the tunnel type supported by the next-hop switch, which avoids using tunnel switching, a mapping mechanism, a gateway, or a bridge into a data packet forwarding process, and further reduces data packet forwarding complexity.

Figure 4:
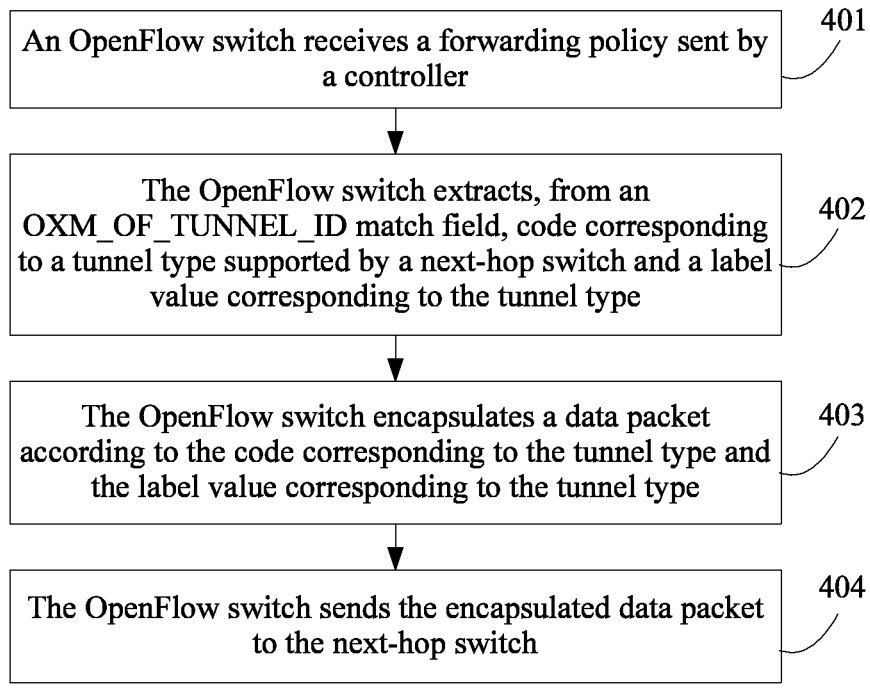
FIG. 4 is a flowchart of still another tunnel type selection method according to an embodiment of the present disclosure.

An embodiment of the present disclosure provides still another tunnel type selection method. As shown in FIG. 4, the method includes

401. An OPENFLOW switch receives a forwarding policy sent by a controller.

The forwarding policy carries an OXM_OF_TUNNEL_ID match field. In this embodiment of the present disclosure, the OPENFLOW switch receives the forwarding policy sent by the controller such that the OPENFLOW switch encapsulates a data packet according to the forwarding policy and a tunnel type supported by a conventional switch.

For this embodiment of the present disclosure, the tunnel type supported by the conventional switch may include VLAN, VXLAN, GRE, and the like. In this embodiment of the present disclosure, different conventional switches may support different tunnel types.

For this embodiment of the present disclosure, an OPENFLOW switch is a switch that can support an OXM_OF_TUNNEL_ID match field. The OXM_OF_TUNNEL_ID match field may be applicable to different tunnel types. For example, the OXM_OF_TUNNEL_ID match field may support a VLAN tunnel type mode, a VXLAN tunnel type mode, a GRE tunnel type mode, a hybrid mode of a VLAN tunnel type and a VXLAN tunnel type, a hybrid mode of a VLAN tunnel type and a GRE tunnel type, a hybrid mode of a VXLAN tunnel type and a GRE tunnel type, and the like. In this embodiment of the present disclosure, the OXM_OF_TUNNEL_ID match field may further be applicable to a user-defined tunnel type.

402. The OPENFLOW switch extracts, from an OXM_OF_TUNNEL_ID match field, code corresponding to a tunnel type supported by a next-hop switch and a label value corresponding to the tunnel type.

For example, step 402 may be as follows: A value of the OXM_OF_TUNNEL_ID match field received by the OPENFLOW switch is 0000000100000000000000000000000000000000000001111111110001000, the code that is corresponding to the tunnel type supported by the next-hop switch and that is extracted from the OXM_OF_TUNNEL_ID match field is 00000001, and the label value corresponding to the tunnel type supported by the next-hop switch is 00000000000000000000000000000000000000001111111110001000.

403. The OPENFLOW switch encapsulates a data packet according to the code corresponding to the tunnel type and the label value corresponding to the tunnel type.

For example, step 403 may be as follows The OPENFLOW switch may determine, according to the code 00000001 corresponding to the tunnel type and the label value 000000000000000000000000000000000000000001111111110001000 corresponding to the tunnel type, that the corresponding tunnel type is the VLAN tunnel type, and encapsulates a data packet according to a format corresponding to the VLAN tunnel type.

For this embodiment of the present disclosure, the code corresponding to the tunnel type may be represented using 8 bits (bit), or may be represented using 16 bits, which is not limited in this embodiment of the present disclosure. In this embodiment of the present disclosure, a 64-bit OXM_OF_TUNNEL_ID match field is split, where some bits of the 64-bit OXM_OF_TUNNEL_ID match field are used to represent the code corresponding to the tunnel type, and the other bits are used to represent a label value corresponding to the tunnel type. For example, if the former 8 bits are used as a tunnel type identifier and are used to represent the code corresponding to the tunnel type, the latter 56 bits are used as a tunnel type label value and are used to represent the label value corresponding to the tunnel type. For another example, if the former 16 bits are used as the tunnel type identifier and are used to represent the code corresponding to the tunnel type, the latter 48 bits are used as the tunnel type label value and are used to represent the label value corresponding to the tunnel type.

404. The OPENFLOW switch sends the encapsulated data packet to the next-hop switch.

For this embodiment of the present disclosure, the OPENFLOW switch sends the encapsulated data packet to a conventional switch such that the data packet received by the conventional switch is a data packet that is encapsulated according to the tunnel type supported by the conventional switch.

For this embodiment of the present disclosure, if the previous-hop switch is an OPENFLOW switch that supports the OXM_OF_TUNNEL_ID match field, and the next-hop switch is also an OPENFLOW switch that supports the OXM_OF_TUNNEL_ID match field, a data packet may be forwarded directly between the previous-hop switch and the next-hop switch according to a value of the OXM_OF_TUNNEL_ID match field.

For this embodiment of the present disclosure, if the previous-hop switch is an OPENFLOW switch that supports the OXM_OF_TUNNEL_ID match field, but the next-hop switch is a conventional switch, a data packet needs to be first encapsulated, according to a tunnel type supported by the conventional switch, on the previous-hop OPENFLOW switch that supports the OXM_OF_TUNNEL_ID match field, and then forwards the encapsulated data packet to the next-hop conventional switch.

For this embodiment of the present disclosure, the next-hop switch may be a conventional switch or an OPENFLOW switch. The tunnel type supported by the conventional switch may be VLAN, VXLAN, GRE, or the like. The OPENFLOW switch may support the OXM_OF_TUNNEL_ID match field. In this embodiment of the present disclosure, the next-hop switch is a next-hop switch of the previous-hop OPENFLOW switch, the previous-hop OPENFLOW switch is a previous-hop switch of the next-hop switch.

On one hand, when a next-hop switch of the previous-hop OPENFLOW switch is a conventional switch, compared with data packet forwarding using a gateway or a bridge at present, using the method provided in this embodiment of the present disclosure, a data packet may be encapsulated according to code and a label that are of a tunnel type supported by the next-hop conventional switch, which can implement an exchange of the data packet directly between the previous-hop OPENFLOW switch and the next-hop conventional switch, thereby further avoiding using the gateway or the bridge, and reducing data packet forwarding complexity.

On the other hand, when a next-hop switch of the previous-hop OPENFLOW switch is an OPENFLOW switch, using the method provided in this embodiment of the present disclosure, a data packet from the previous-hop OPENFLOW switch may also be encapsulated according to a tunnel type supported by the next-hop OPENFLOW switch, which can implement an exchange of the data packet directly between the previous-hop OPENFLOW switch and next-hop OPENFLOW switch. In this embodiment of the present disclosure, an OPENFLOW switch can support any tunnel type, that is, an OPENFLOW switch can support a tunnel type such as VLAN, VXLAN, or GRE at the same time.

For this embodiment of the present disclosure, as shown in FIG. 1, after the OPENFLOW switch 1 forwards the encapsulated data packet to the switch, the switch may further forward the data packet to the OPENFLOW switch 2 according to a tunnel type matched with the switch. In this embodiment of the present disclosure, the OPENFLOW switch 2 parses an encapsulation format of the received data packet, extracts a label value of the tunnel type from the received data packet, generates by a combination an OXM_OF_TUNNEL_ID match field corresponding to the data packet according to the label value of the tunnel type and code that is of the tunnel type and that is preset by the controller, and, matches a corresponding flow table entry in a flow table of the OPENFLOW switch 2.

According to the tunnel type selection method provided in this embodiment of the present disclosure, first, a controller combines code and a label value that are corresponding to a tunnel type supported by a next-hop switch, generates an OXM_OF_TUNNEL_ID match field, and sends a forwarding policy that carries the OXM_OF_TUNNEL_ID match field to a previous-hop OPENFLOW switch, then, the previous-hop OPENFLOW switch extracts, from the received OXM_OF_TUNNEL_ID match field, the code and the label value that are corresponding to the tunnel type, and encapsulates a data packet according to the code and the label value that are corresponding to the tunnel type, finally, the previous-hop OPENFLOW switch sends the encapsulated data packet to the next-hop switch. Compared with data packet forwarding using a gateway or a bridge at present, in this embodiment of the present disclosure, a controller generates an OXM_OF_TUNNEL_ID match field according to a tunnel type supported by a next-hop switch, and sends a forwarding policy that carries the OXM_OF_TUNNEL_ID match field to a previous-hop OPENFLOW switch such that the previous-hop OPENFLOW switch encapsulates a data packet according to the tunnel type supported by the next-hop switch, which avoids using tunnel switching, a mapping mechanism, a gateway, or a bridge into a data packet forwarding process, and further reduces data packet forwarding complexity.

Figure 5:
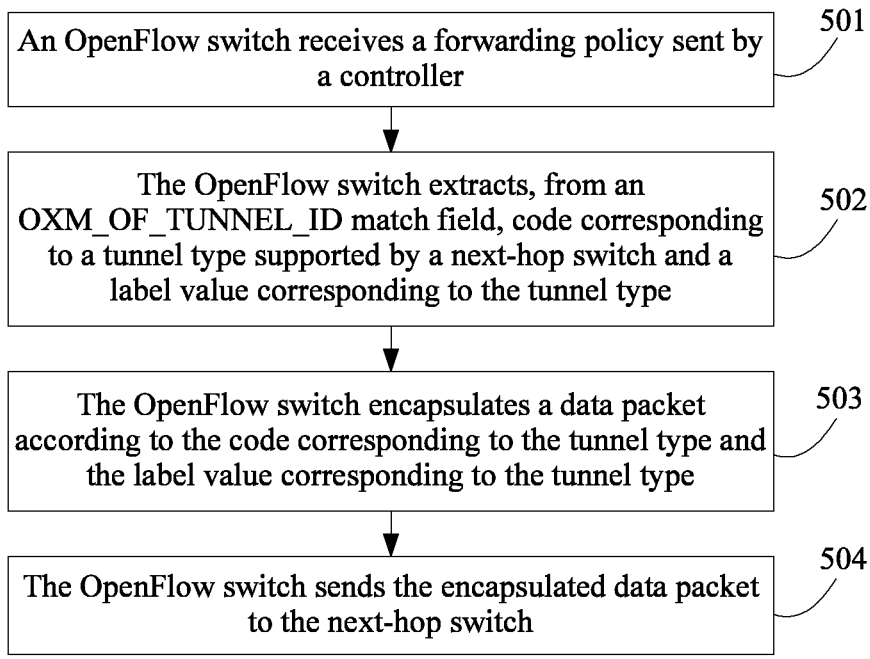
FIG. 5 is a flowchart of yet another tunnel type selection method according to an embodiment of the present disclosure.

An embodiment of the present disclosure provides yet another tunnel type selection method. As shown in FIG. 5, the method includes 501. An OPENFLOW switch receives a forwarding policy sent by a controller.

The forwarding policy carries an OXM_OF_TUNNEL_ID match field. In this embodiment of the present disclosure, the OPENFLOW switch receives the forwarding policy sent by the controller such that the OPENFLOW switch encapsulates a data packet according to the forwarding policy and a tunnel type supported by a conventional switch.

In an embodiment, before step 501, the method may further include sending, by the OPENFLOW switch, a new flow forwarding request to the controller.

The OPENFLOW switch sends the new stream forwarding request (packet in) to the controller, and therefore the controller can be triggered to generate the OXM_OF_TUNNEL_ID match field according to the tunnel type supported by the conventional switch. In this embodiment of the present disclosure, the new flow forwarding request may carry a user requirement and a service requirement such that the controller can calculate a forwarding path according to the user requirement and the service requirement, and determine tunnel types respectively supported by all switches on the forwarding path.

For this embodiment of the present disclosure, the tunnel type supported by the conventional switch includes VLAN, VXLAN, GRE, and the like. In this embodiment of the present disclosure, different conventional switches may support different tunnel types.

For this embodiment of the present disclosure, an OPENFLOW switch is a switch that can support an OXM_OF_TUNNEL_ID match field. The OXM_OF_TUNNEL_ID match field may be applicable to different tunnel types. For example, the OXM_OF_TUNNEL_ID match field may support a VLAN tunnel type mode, a VXLAN tunnel type mode, a GRE tunnel type mode, a hybrid mode of a VLAN tunnel type and a VXLAN tunnel type, a hybrid mode of a VLAN tunnel type and a GRE tunnel type, a hybrid mode of a VXLAN tunnel type and a GRE tunnel type, and the like. In this embodiment of the present disclosure, the OXM_OF_TUNNEL_ID match field may further be applicable to a user-defined tunnel type.

502. The OPENFLOW switch extracts, from an OXM_OF_TUNNEL_ID match field, code corresponding to a tunnel type supported by a next-hop switch and a label value corresponding to the tunnel type.

In an embodiment, the OPENFLOW switch extracts, from some bits of the OXM_OF_TUNNEL_ID match field, the code corresponding to the tunnel type, and extracts, from the other bits of the OXM_OF_TUNNEL_ID match field, the label value corresponding to the tunnel type.

For example, a value of the OXM_OF_TUNNEL_ID match field received by the OPENFLOW switch is 0000000100000000000000000000000000000000 0000011111111110001000, the code that is corresponding to the tunnel type supported by the next-hop switch and that is extracted from the OXM_OF_TUNNEL_ID match field is 00000001, and the label value corresponding to the tunnel type supported by the next-hop switch is 0000000000000000000000000000000000000000111 1111110001000. Further, the OPENFLOW switch may determine that the corresponding tunnel type is the VLAN tunnel type.

For this embodiment of the present disclosure, the code corresponding to the tunnel type may be represented using 8 bits (bit), or may be represented using 16 bits, which is not limited in this embodiment of the present disclosure. In this embodiment of the present disclosure, a 64-bit OXM_OF_TUNNEL_ID match field is split, where some bits of the 64-bit OXM_OF_TUNNEL_ID match field are used to represent the code corresponding to the tunnel type, and the other bits are used to represent a label value corresponding to the tunnel type. For example, if the former 8 bits are used as a tunnel type identifier and are used to represent the code corresponding to the tunnel type, the latter 56 bits are used as a tunnel type label value and are used to represent the label value corresponding to the tunnel type. For another example, if the former 16 bits are used as the tunnel type identifier and are used to represent the code corresponding to the tunnel type, the latter 48 bits are used as the tunnel type label value and are used to represent the label value corresponding to the tunnel type.

The controller pre-configures a correspondence between a tunnel type and code corresponding to the tunnel type, and stores the correspondence in a tunnel type and code mapping table. For example, the correspondence that is between a tunnel type and code corresponding to the tunnel type and that is pre-configured by the controller is as follows Code corresponding to a user-defined tunnel type mode is 00000000, code corresponding to a VLAN tunnel type mode is 00000001, code corresponding to a VXLAN tunnel type mode is 00000010, code corresponding to a GRE tunnel type mode is 00000011, code corresponding to a hybrid mode of a VLAN tunnel type and a VXLAN tunnel type is 00000100, code corresponding to a hybrid mode of a VLAN tunnel type and a GRE tunnel type is 00000101, code corresponding to a hybrid mode of a VXLAN tunnel type and a GRE tunnel type is 00000110. In this case, the tunnel type and code mapping table may be shown in the following table 3

TABLE 3

| Tunnel type | Code corresponding to the tunnel type |
|---|---|
| User-defined tunnel type | 00000000 |
| VLAN tunnel type | 00000001 |
| VXLAN tunnel type | 00000010 |
| GRE tunnel type | 00000011 |
| Hybrid mode of a VLAN tunnel type and a VXLAN tunnel type | 00000100 |
| Hybrid mode of a VLAN tunnel type and a GRE tunnel type | 00000101 |
| Hybrid mode of a VXLAN tunnel type and a GRE tunnel type | 00000110 |

In an embodiment, the tunnel type and code mapping table may include the user-defined tunnel type and code corresponding to the user-defined tunnel type.

For this embodiment of the present disclosure, the tunnel type and code mapping table includes the user-defined tunnel type and the code corresponding to the user-defined tunnel type such that the OXM_OF_TUNNEL_ID match field can support the user-defined tunnel type, and the OPENFLOW switch can encapsulate a data packet according to the user-defined tunnel type supported by the conventional switch.

For this embodiment of the present disclosure, when the tunnel type supported by the conventional switch is the user-defined tunnel type, if a network scale is relatively small, a label value corresponding to the user-defined tunnel type may be represented using a relatively small quantity of bits, and data packet encapsulation, data forwarding and isolation, and the like may be performed according to the label value corresponding to the user-defined tunnel type, for example, the label value corresponding to the user-defined tunnel type is represented using 24 bits. If the network scale is relatively large, capacity expansion may be performed on the label value corresponding to the user-defined tunnel, for example, when the controller finds that the label value corresponding to the user-defined tunnel type in a current network is insufficient, capacity expansion may be performed on the label value corresponding to the user-defined tunnel type.

0s may be added to the front of or 1s may be added to the front of label values corresponding to all current user-defined tunnel types such that capacity expansion is performed on the label value corresponding to the user-defined tunnel type while ensuring compatibility of a new user-defined tunnel type with an original user-defined tunnel type. For example, if a label value corresponding to an original user-defined tunnel type is 24 bits, after a 0 or a 1 is added to the first 8 bits, the label value corresponding to the user-defined tunnel type may be expanded to 32 bits.

503. The OPENFLOW switch encapsulates a data packet according to the code corresponding to the tunnel type and the label value corresponding to the tunnel type.

504. The OPENFLOW switch sends the encapsulated data packet to the next-hop switch.

For this embodiment of the present disclosure, the OPENFLOW switch sends the encapsulated data packet to a conventional switch such that the data packet received by the conventional switch is a data packet that is encapsulated according to the tunnel type supported by the conventional switch.

For this embodiment of the present disclosure, if the previous-hop switch is an OPENFLOW switch that supports the OXM_OF_TUNNEL_ID match field, and the next-hop switch is also an OPENFLOW switch that supports the OXM_OF_TUNNEL_ID match field, a data packet may be forwarded directly between the previous-hop switch and the next-hop switch according to a value of the OXM_OF_TUNNEL_ID match field.

For this embodiment of the present disclosure, if the previous-hop switch is an OPENFLOW switch that supports the OXM_OF_TUNNEL_ID match field, but the next-hop switch is a conventional switch, a data packet needs to be first encapsulated, according to a tunnel type supported by the conventional switch, on the previous-hop OPENFLOW switch that supports the OXM_OF_TUNNEL_ID match field, and then forwards the encapsulated data packet to the next-hop conventional switch.

For this embodiment of the present disclosure, the next-hop switch may be a conventional switch or an OPENFLOW switch. The tunnel type supported by the conventional switch may be VLAN, VXLAN, GRE, or the like. The OPENFLOW switch may support the OXM_OF_TUNNEL_ID match field. In this embodiment of the present disclosure, the next-hop switch is a next-hop switch of the previous-hop OPENFLOW switch, the previous-hop OPENFLOW switch is a previous-hop switch of the next-hop switch.

On one hand, when a next-hop switch of the previous-hop OPENFLOW switch is a conventional switch, compared with data packet forwarding using a gateway or a bridge at present, using the method provided in this embodiment of the present disclosure, a data packet may be encapsulated according to code and a label that are of a tunnel type supported by the next-hop conventional switch, which can implement an exchange of the data packet directly between the previous-hop OPENFLOW switch and the next-hop conventional switch, thereby further avoiding using the gateway or the bridge, and reducing data packet forwarding complexity.

On the other hand, when a next-hop switch of the previous-hop OPENFLOW switch is an OPENFLOW switch, using the method provided in this embodiment of the present disclosure, a data packet from the previous-hop OPENFLOW switch may also be encapsulated according to a tunnel type supported by the next-hop OPENFLOW switch, which can implement an exchange of the data packet directly between the previous-hop OPENFLOW switch and next-hop OPENFLOW switch. In this embodiment of the present disclosure, an OPENFLOW switch can support any tunnel type, that is, an OPENFLOW switch can support a tunnel type such as VLAN, VXLAN, or GRE at the same time.

For this embodiment of the present disclosure, as shown in FIG. 1, after the OPENFLOW switch 1 forwards the encapsulated data packet to the switch, the switch may further forward the data packet to the OPENFLOW switch 2 according to a tunnel type matched with the switch. In this embodiment of the present disclosure, the OPENFLOW switch 2 parses an encapsulation format of the received data packet, extracts a label value of the tunnel type from the received data packet, generates by a combination an OXM_OF_TUNNEL_ID match field corresponding to the data packet according to the label value of the tunnel type and code that is of the tunnel type and that is preset by the controller, and, matches a corresponding flow table entry in a flow table of the OPENFLOW switch 2.

According to the tunnel type selection method provided in this embodiment of the present disclosure, first, a controller combines code and a label value that are corresponding to a tunnel type supported by a next-hop switch, generates an OXM_OF_TUNNEL_ID match field, and sends a forwarding policy that carries the OXM_OF_TUNNEL_ID match field to a previous-hop OPENFLOW switch, then, the previous-hop OPENFLOW switch extracts, from the received OXM_OF_TUNNEL_ID match field, the code and the label value that are corresponding to the tunnel type, and encapsulates a data packet according to the code and the label value that are corresponding to the tunnel type, finally, the previous-hop OPENFLOW switch sends the encapsulated data packet to the next-hop switch. Compared with data packet forwarding using a gateway or a bridge at present, in this embodiment of the present disclosure, a controller generates an OXM_OF_TUNNEL_ID match field according to a tunnel type supported by a next-hop switch, and sends a forwarding policy that carries the OXM_OF_TUNNEL_ID match field to a previous-hop OPENFLOW switch such that the previous-hop OPENFLOW switch encapsulates a data packet according to the tunnel type supported by the next-hop switch, which avoids using tunnel switching, a mapping mechanism, a gateway, or a bridge into a data packet forwarding process, and further reduces data packet forwarding complexity.

Figure 6:
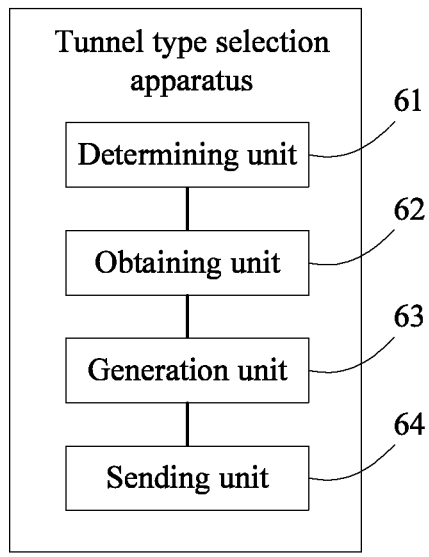
FIG. 6 is a schematic structural diagram of a tunnel type selection apparatus according to an embodiment of the present disclosure.

An embodiment of the present disclosure provides a tunnel type selection apparatus. As shown in FIG. 6, an entity of the apparatus may be a controller, and the apparatus includes a determining unit 61, an obtaining unit 62, a generation unit 63, and a sending unit 64.

The determining unit 61 is configured to determine a tunnel type supported by a next-hop switch.

The obtaining unit 62 is configured to obtain, from a tunnel type and code mapping table, code corresponding to the tunnel type determined by the determining unit 61.

The generation unit 63 is configured to generate a label value corresponding to the tunnel type, and combine the code that is corresponding to the tunnel type and that is obtained by the obtaining unit 62 with the label value corresponding to the tunnel type to generate an OXM_OF_TUNNEL_ID match field.

The sending unit 64 is configured to send a forwarding policy to a previous-hop OPENFLOW switch.

The forwarding policy carries the OXM_OF_TUNNEL_ID match field generated by the generation unit 63.

It should be noted that for other corresponding descriptions corresponding to all function units in the tunnel type selection apparatus provided in this embodiment of the present disclosure, refer to corresponding descriptions in the embodiment of FIG. 2, and details are not described herein again.

The determining unit 61 is further configured to determine whether the previous-hop OPENFLOW switch is an OPENFLOW switch that supports the OXM_OF_TUNNEL_ID match field.

The determining unit 61 is configured to, when the previous-hop OPENFLOW switch is an OPENFLOW switch that supports the OXM_OF_TUNNEL_ID match field, determine the tunnel type supported by the next-hop switch.

The generation unit 63 is further configured to generate code respectively corresponding to all tunnel types.

Figure 7:
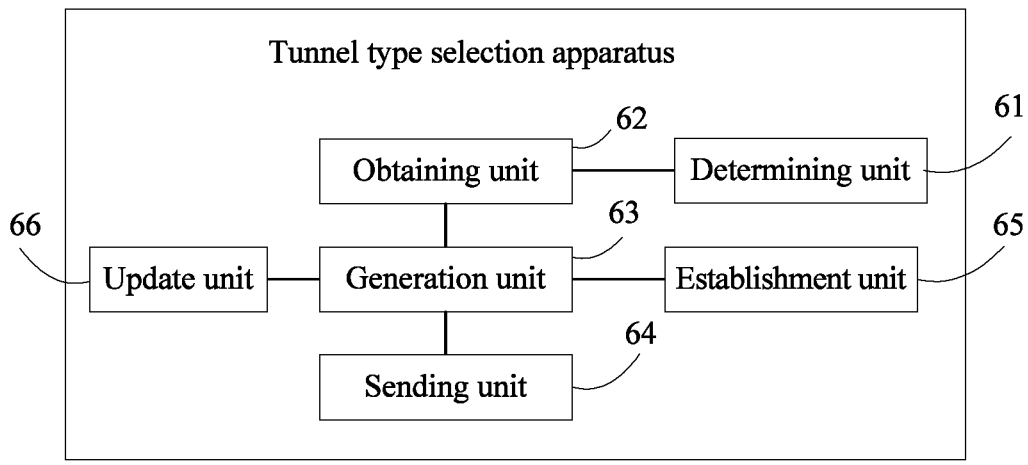
FIG. 7 is a schematic structural diagram of another tunnel type selection apparatus according to an embodiment of the present disclosure.

Further, this embodiment of the present disclosure provides another tunnel type selection apparatus. As shown in FIG. 7, the apparatus may further include an establishment unit 65.

The establishment unit 65 is further configured to establish the tunnel type and code mapping table.

The tunnel type and code mapping table includes all the tunnel types and the code that is respectively corresponding to all the tunnel types and that is generated by the generation unit 63.

The determining unit 61 is further configured to, when a switch that newly accesses a network exists, determine a tunnel type supported by the switch that newly accesses the network.

The generation unit 63 is further configured to generate code corresponding to the tunnel type that is determined by the determining unit 61 and that is supported by the switch that newly accesses the network.

In an embodiment, the apparatus may further include an update unit 66.

The update unit 66 is configured to update the tunnel type and code mapping table according to the code that is generated by the generation unit 63 and that is corresponding to the tunnel type supported by the switch that newly accesses the network.

The tunnel type and code mapping table established by the establishment unit 65 includes a user-defined tunnel type and code corresponding to the user-defined tunnel type.

It should be noted that for other corresponding descriptions corresponding to all function units in the tunnel type selection apparatus provided in this embodiment of the present disclosure, refer to corresponding descriptions in FIG. 3, and details are not described herein again.

Figure 8:
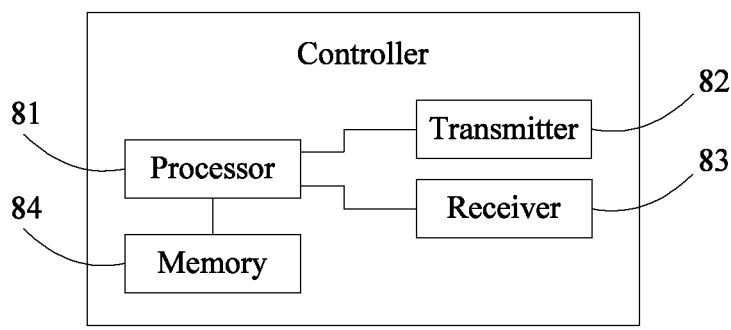
FIG. 8 is a schematic structural diagram of a controller according to an embodiment of the present disclosure.

An embodiment of the present disclosure provides a controller. As shown in FIG. 8, the controller may include a processor 81, a transmitter 82, a receiver 83, and a memory 84, and the receiver 83 and the memory 84 are connected to the processor 81.

The processor 81 is configured to first determine a tunnel type supported by a next-hop switch, then obtain, from a tunnel type and code mapping table, code corresponding to the tunnel type, generate a label value corresponding to the tunnel type, and finally combine the code corresponding to the tunnel type with the label value corresponding to the tunnel type to generate an OXM_OF_TUNNEL_ID match field.

The transmitter 82 is configured to send a forwarding policy to a previous-hop OPENFLOW switch.

The forwarding policy may carry the OXM_OF_TUNNEL_ID match field generated by the processor 81.

It should be noted that for other corresponding descriptions corresponding to all devices in the controller provided in this embodiment of the present disclosure, refer to corresponding descriptions in FIG. 2, and details are not described herein again.

The processor 81 is further configured to determine whether the previous-hop OPENFLOW switch is an OPENFLOW switch that supports the OXM_OF_TUNNEL_ID match field.

The processor 81 is configured to, when the previous-hop OPENFLOW switch is an OPENFLOW switch that supports the OXM_OF_TUNNEL_ID match field, determine the tunnel type supported by the next-hop switch.

The processor 81 is further configured to generate code respectively corresponding to all tunnel types.

The processor 81 is further configured to establish a tunnel type and code mapping table.

The tunnel type and code mapping table includes all the tunnel types and the code respectively corresponding to all the tunnel types.

The processor 81 is further configured to, when a switch that newly accesses a network exists, determine a tunnel type supported by the switch that newly accesses the network.

The processor 81 is further configured to generate code corresponding to the tunnel type supported by the switch that newly accesses the network.

The processor 81 is further configured to update the tunnel type and code mapping table according to the code corresponding to the tunnel type supported by the switch that newly accesses the network.

The tunnel type and code mapping table established by the processor 81 includes a user-defined tunnel type and code corresponding to the user-defined tunnel type.

It should be noted that for other corresponding descriptions corresponding to all devices in the controller provided in this embodiment of the present disclosure, refer to corresponding descriptions in FIG. 3, and details are not described herein again.

Figure 9:
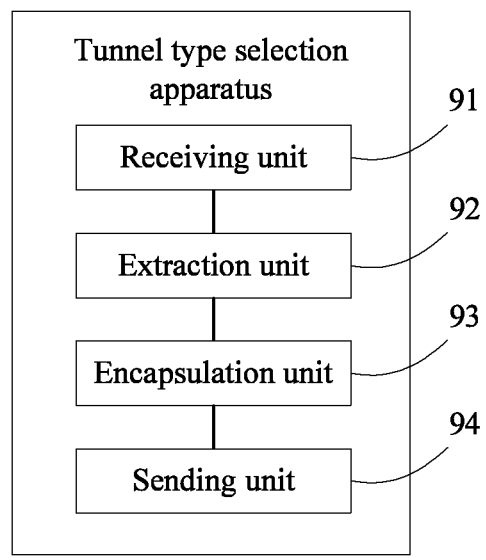
FIG. 9 is a schematic structural diagram of still another tunnel type selection apparatus according to an embodiment of the present disclosure.

An embodiment of the present disclosure provides still another tunnel type selection apparatus. As shown in FIG. 9, an entity of the apparatus may be an OPENFLOW switch, and the apparatus includes a receiving unit 91, an extraction unit 92, an encapsulation unit 93, and a sending unit 94.

The receiving unit 91 is configured to receive a forwarding policy sent by a controller.

The forwarding policy carries an OXM_OF_TUNNEL_ID match field.

The extraction unit 92 is configured to extract, from the OXM_OF_TUNNEL_ID match field received by the receiving unit 91, code corresponding to a tunnel type supported by a next-hop switch and a label value corresponding to the tunnel type.

The encapsulation unit 93 is configured to encapsulate a data packet according to the code that is corresponding to the tunnel type and that is extracted by the extraction unit 92 and the label value that is corresponding to the tunnel type and that is extracted by the extraction unit 92.

The sending unit 94 is configured to send a data packet encapsulated by the encapsulation unit 93 to a conventional switch.

It should be noted that for other corresponding descriptions corresponding to all function units in the tunnel type selection apparatus provided in this embodiment of the present disclosure, refer to corresponding descriptions in FIG. 5, and details are not described herein again.

Figure 10:
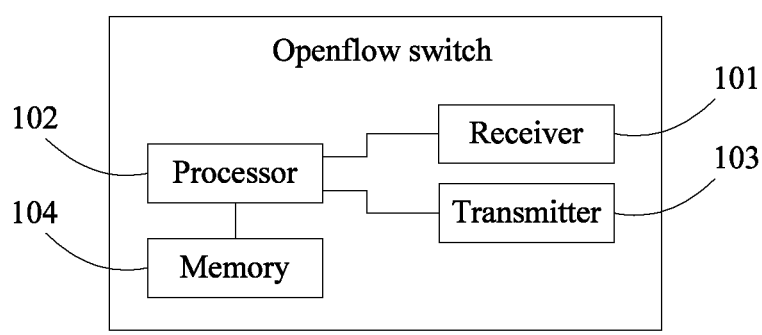
FIG. 10 is a schematic structural diagram of an OPENFLOW switch according to an embodiment of the present disclosure.

An embodiment of the present disclosure provides an OPENFLOW switch. As shown in FIG. 10, the OPENFLOW switch may include a receiver 101, a processor 102, a transmitter 103, and a memory 104, and the memory 104 is connected to the processor 102.

The receiver 101 is configured to receive a forwarding policy sent by a controller.

The forwarding policy carries an OXM_OF_TUNNEL_ID match field.

The processor 102 is configured to extract, from the OXM_OF_TUNNEL_ID match field received by the receiver 101, code corresponding to a tunnel type supported by a next-hop switch and a label value corresponding to the tunnel type, and encapsulate a data packet according to the code corresponding to the tunnel type and the label value corresponding to the tunnel type.

The transmitter 103 is configured to send a data packet encapsulated by the processor to the next-hop switch.

It should be noted that for other corresponding descriptions corresponding to all devices in the OPENFLOW switch provided in this embodiment of the present disclosure, refer to corresponding descriptions in FIG. 5, and details are not described herein again.

The tunnel type selection apparatuses provided in the embodiments of the present disclosure may implement the foregoing provided method embodiments. For specific function implementation, refer to descriptions in the method embodiments, and details are not described herein again. The tunnel type selection method and apparatus provided in the embodiments of the present disclosure may be applicable to data packet forwarding in a hybrid networking environment of an OPENFLOW switch and a conventional switch, however, the present disclosure is not limited thereto.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include a magnetic disk, an optical disc, a Read-Only Memory (ROM), a Random Access Memory (RAM), or the like.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A tunnel type selection method, comprising:
   determining, by a controller, a first tunnel type supported by a next-hop switch;
   obtaining, by the controller based on a tunnel type and code mapping table, a first code corresponding to the first tunnel type;
   generating, by the controller, a label value corresponding to the first tunnel type;
   combining, by the controller, the first code corresponding to the first tunnel type with the label value corresponding to the first tunnel type to generate a combination of the first code and the label value; and
   sending, by the controller, a forwarding policy to a previous-hop OPENFLOW switch, wherein the forwarding policy carries an OXM_OF_TUNNEL_ID match field that includes the combination of the first code and the label value.

2. The tunnel type selection method according to claim 1, wherein before determining the tunnel type supported by the next-hop switch, the method further comprises determining, by the controller, whether the previous-hop OPENFLOW switch supports the OXM_OF_TUNNEL_ID match field, and wherein determining the tunnel type supported by the next-hop switch comprises determining, by the controller, the tunnel type supported by the next-hop switch when the previous-hop OPENFLOW switch supports the OXM_OF_TUNNEL_ID match field.

3. The tunnel type selection method according to claim 1, wherein before determining the tunnel type supported by the next-hop switch, the method further comprises:
   generating, by the controller, codes respectively corresponding to all tunnel types, wherein the codes include the first code, and wherein the tunnel types include the first tunnel type; and
   establishing, by the controller, the tunnel type and code mapping table, wherein the tunnel type and code mapping table comprises all the tunnel types and the codes respectively corresponding to all the tunnel types.

4. The tunnel type selection method according to claim 3, wherein after establishing the tunnel type and code mapping table, the method further comprises:
   determining, by the controller, a second tunnel type supported by a switch that newly accesses the network when the switch that newly accesses a network exists;
   generating, by the controller, a second code corresponding to the second tunnel type supported by the switch that newly accesses the network; and
   updating, by the controller, the tunnel type and code mapping table according to the second code corresponding to the second tunnel type supported by the switch that newly accesses the network.

5. The tunnel type selection method according to claim 1, wherein the tunnel type and code mapping table comprises a user-defined tunnel type and a code corresponding to the user-defined tunnel type.

6. The method according to claim 1, wherein the next-hop switch is a conventional switch.

7. The method according to claim 1, wherein the first code includes eight bits.

8. The method according to claim 1, wherein the OXM_OF_TUNNEL_ID match field includes sixty four bits.

9. The method according to claim 1, further comprising receiving, by the controller from the previous-hop OPENFLOW switch, a new flow forwarding request.

10. The method according to claim 9, further comprising calculating, by the controller, a forwarding path according to the new flow forwarding request.

11. A tunnel type selection method, comprising:
    receiving, by an OPENFLOW switch, a forwarding policy from a controller, wherein the forwarding policy carries an OXM_OF_TUNNEL_ID match field that includes a combination of a code corresponding to a tunnel type supported by a next-hop switch and a label corresponding to the tunnel type;
    extracting, by the OPENFLOW switch from the OXM_OF_TUNNEL_ID match field, the code corresponding to the tunnel type supported by t next-hop switch and the label value corresponding to the tunnel type;
    encapsulating, by the OPENFLOW switch, a data packet according to the code corresponding to the tunnel type and the label value corresponding to the tunnel type; and
    sending, by the OPENFLOW switch, the encapsulated data packet to the next-hop switch.

12. The method according to claim 11, wherein the next-hop switch is a conventional switch.

13. A controller, comprising:
    a processor configured to:
      determine a first tunnel type supported by a next-hop switch;
      obtain, based on a tunnel type and code mapping table, a first code corresponding to the first tunnel type;
      generate a label value corresponding to the first tunnel type; and
      combine the code corresponding to the first tunnel type with the label value corresponding to the first tunnel type to generate a combination of the first code and the label value; and
    a transmitter coupled to the processor and configured to send a forwarding policy to a previous-hop OPENFLOW switch, wherein the forwarding policy carries an OXM_OF_TUNNEL_ID match field that includes the combination of the first code and the label value.

14. The controller according to claim 13, wherein the processor is further configured to:
    determine whether the previous-hop OPENFLOW switch supports the OXM_OF_TUNNEL_ID match field; and
    determine the tunnel type supported by the next-hop switch when the previous-hop OPENFLOW switch supports the OXM_OF_TUNNEL_ID match field.

15. The controller according to claim 13, wherein processor is further configured to:
    generate codes respectively corresponding to all tunnel types, wherein the codes include the first code, and wherein the tunnel types include the first tunnel type; and
    establish the tunnel type and code mapping table, wherein the tunnel type and code mapping table comprises all the tunnel types and the codes respectively corresponding to all the tunnel types.

16. The controller according to claim 15, wherein the processor is further configured to:
- determine a second tunnel type supported by a switch that newly accesses the network when the switch that newly accesses a network exists;
- generate a second code corresponding to the second tunnel type supported by the switch that newly accesses the network; and
- update the tunnel type and code mapping table according to the second code corresponding to the second tunnel type supported by the switch that newly accesses the network.

17. The controller according to claim 13, wherein the tunnel type and code mapping table established by the processor comprises a user-defined tunnel type and a code corresponding to the user-defined tunnel type.

18. A switching apparatus, comprising:
- a processor;
- a memory; and
- a bus;
- wherein the memory is configured to store a computer-executable instruction,
- wherein the processor is coupled to the memory using the bus, and
- wherein when the switching apparatus runs, the processor is configured to execute the computer-executable instruction stored in the memory such that the switching apparatus:
  - receives a forwarding policy from a controller, wherein the forwarding policy carries an OXM_OF_TUNNEL_ID match field that includes a combination of a code corresponding to a tunnel type supported by a next-hop switch and a label corresponding to the tunnel type;
  - extracts, from the OXM_OF_TUNNEL_ID match field, the code corresponding to the tunnel type supported by the next-hop switch and the label value corresponding to the tunnel type;
  - encapsulates a data packet according to the code corresponding to the tunnel type and the label value corresponding to the tunnel type; and
  - sends a data packet encapsulated by the processor to the next-hop switch.

* * * * *

UNITED STATES PATENT AND TRADEMARK OFFICE
CERTIFICATE OF CORRECTION

PATENT NO. : 10,003,503 B2
APPLICATION NO. : 15/298476
DATED : June 19, 2018
INVENTOR(S) : Jiao Wang Page 1 of 1

It is certified that error appears in the above-identified patent and that said Letters Patent is hereby corrected as shown below:

On the Title Page

Item (73), Notice, Line 3: "0 days. days." should be "0 days."

In the Claims

Column 24, Line 22: In Claim 11, "t" should be "the"

Signed and Sealed this
Fourth Day of June, 2019

Andrei Iancu
*Director of the United States Patent and Trademark Office*